Sept. 9, 1952      E. L. DANIELSON ET AL      2,609,570
METHOD FOR FORMING A MULTIPART PLASTIC ARTICLE
Filed Jan. 22, 1951      4 Sheets-Sheet 1
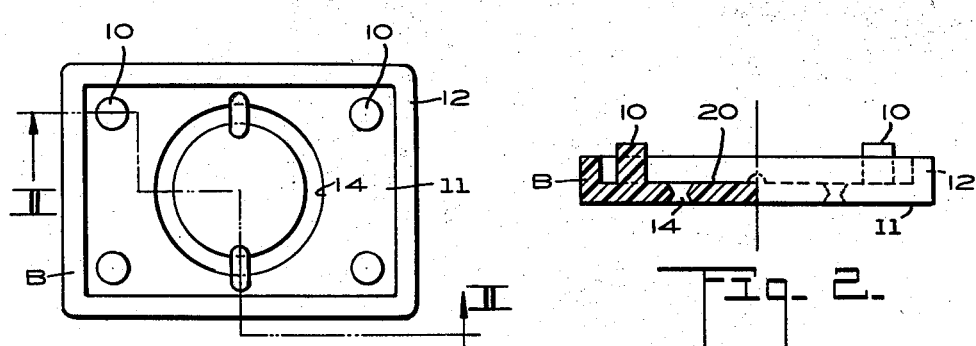
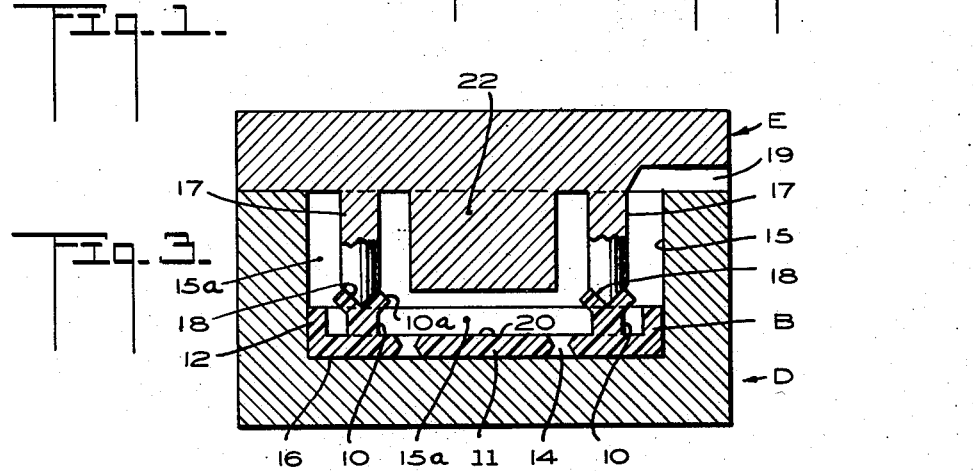
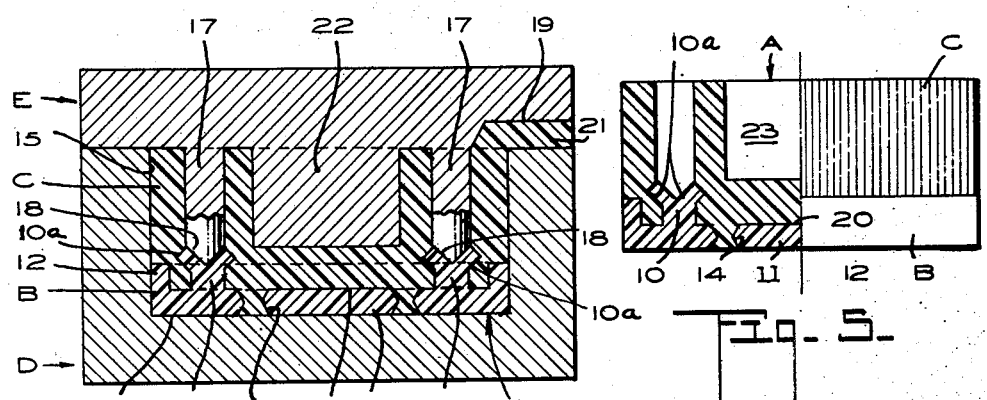
INVENTORS
ELMER L. DANIELSON
FLOYD J. DOFSEN
BY
*Munn, Liddy & Glaccum*
ATTORNEYS

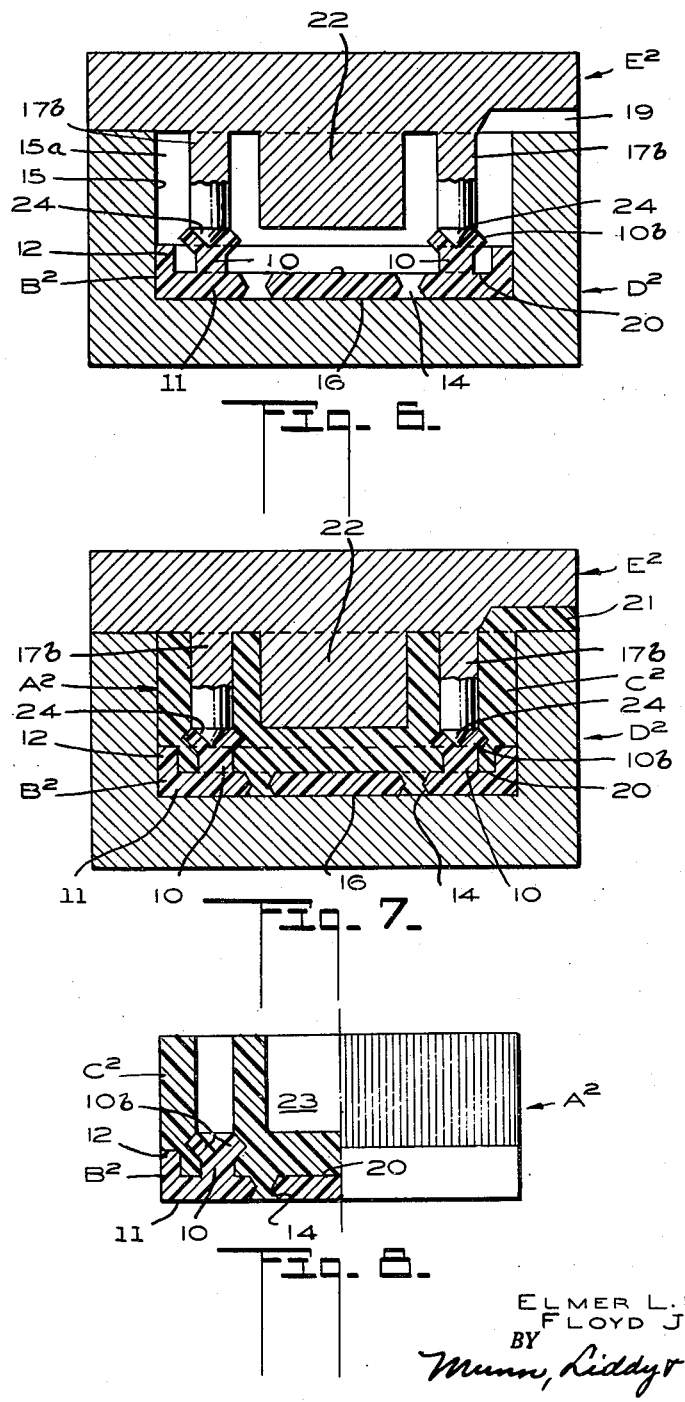

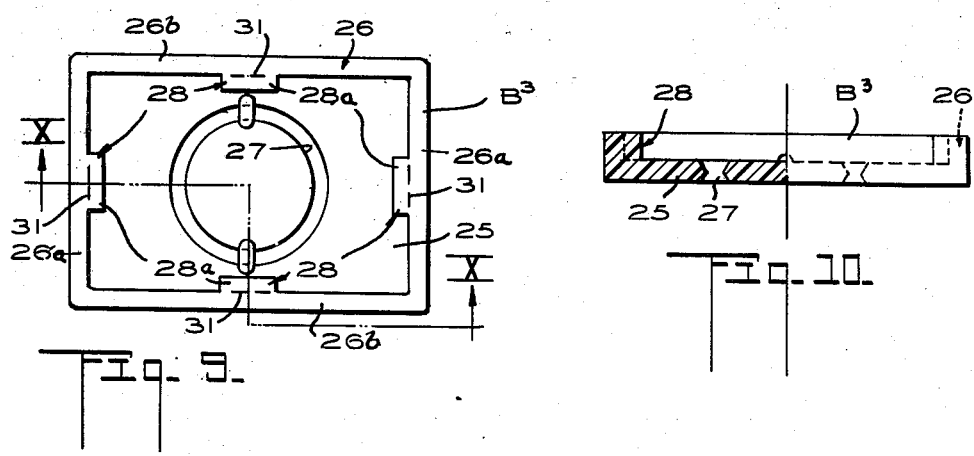
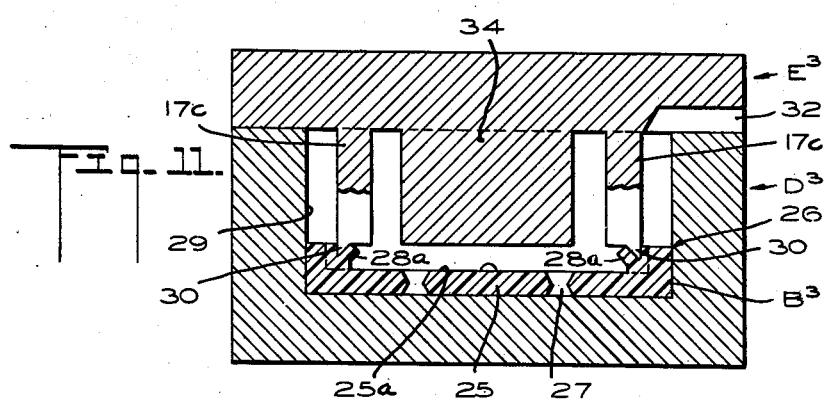
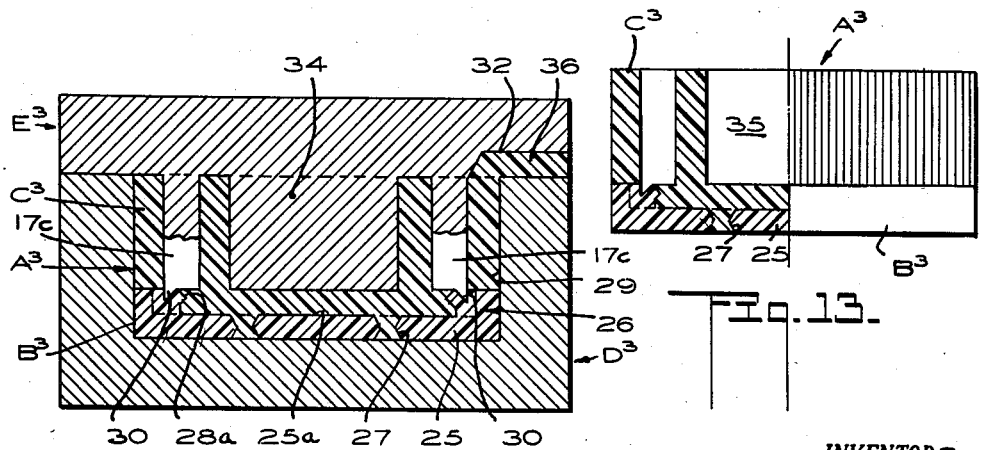
INVENTORS
ELMER L. DANIELSON
FLOYD J. DOFSEN
BY
ATTORNEYS

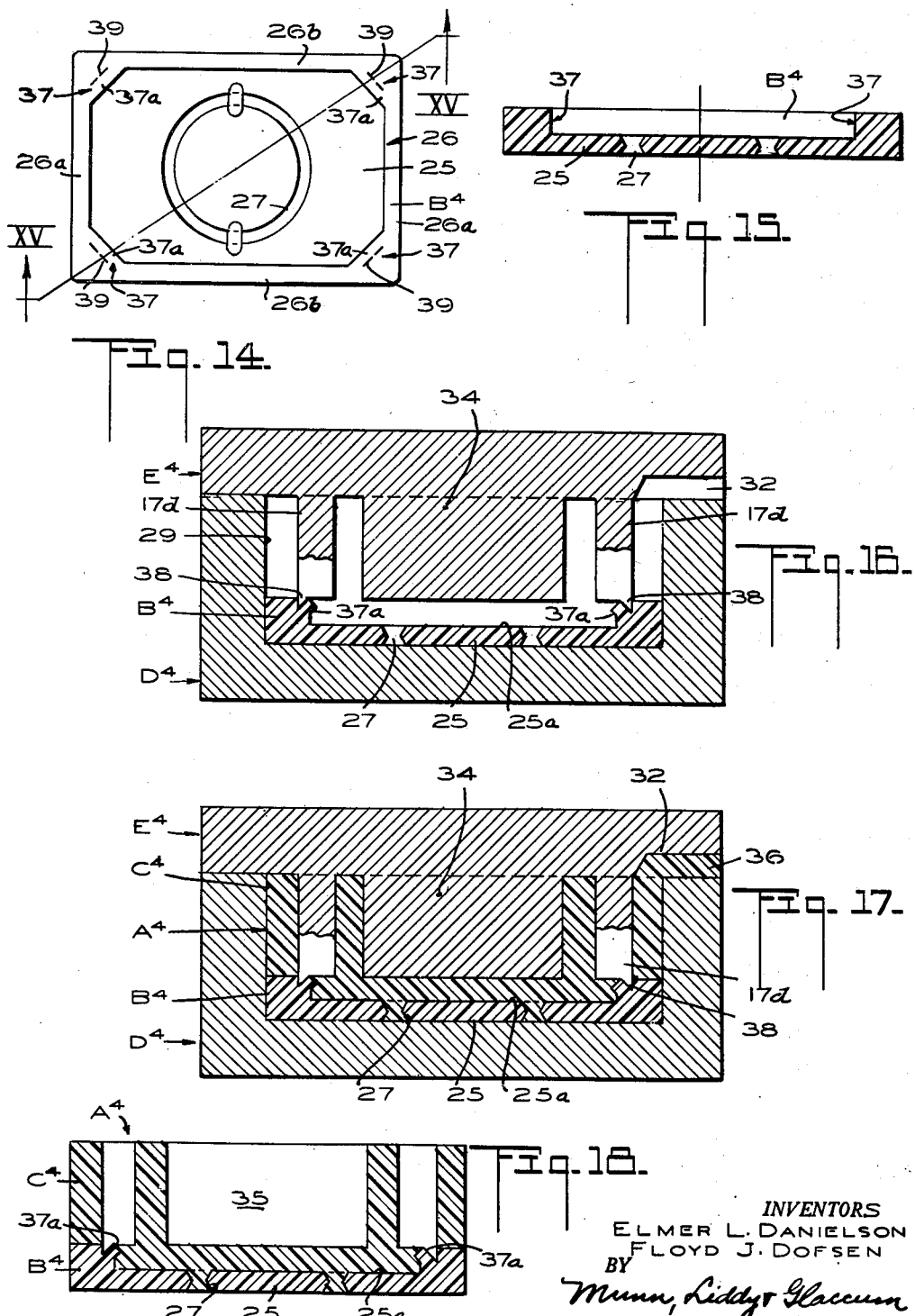

Patented Sept. 9, 1952

2,609,570

UNITED STATES PATENT OFFICE 2,609,570

METHOD FOR FORMING A MULTIPART PLASTIC ARTICLE

Elmer L. Danielson, Oakland, and Floyd J. Dofsen, San Francisco, Calif.

Application January 22, 1951, Serial No. 207,174

7 Claims. (Cl. 18—59)

The present invention relates to improvements in a method for forming a multi-part plastic article with mechanical interlocks. It embodies modifications and improvements over our copending application, Serial No. 203,992, filed in the United States Patent Office on January 2, 1951, entitled: "Method for Forming a Composite Plastic Structure."

In our copending case, as identified above, we cast a first part of the plastic structure, with projections extending from a surface thereof against which a second plastic part is to be cast. Thereafter, this precast part is placed in a cavity provided in one die of a mold, and then a second die is moved into coacting relation with the first to close the mold. During the closing of the mold, the projections are automatically deflected, or upset, and are retained in these positions by the dies. Upon injecting the material for the second plastic part of the composite structure, it is conveyed over the surface of the precast part and around the deflected projections to embed the latter therein. These projections mechanically interlock the two plastic parts.

Our present invention provides for precasting a first plastic part; inserting this part into a cavity of a first die; and then closing the open end of the cavity with a second die. This follows the same general pattern as in our copending application. However, the second die to be disclosed in the instant case has at least one chisel thereon. As the two dies are closed, this chisel is disposed for cutting into and deflecting a portion of the precast part. This portion is maintained in its deflected position during the casting of a second plastic part against the first, with the deflected portion serving as a mechanical interlock between the two plastic parts.

In certain species of the present invention, we provide preshaped projections on the precast plastic part. Chisels of various shapes are utilized on the second die for cutting into and deflecting, or spreading, portions of the projections of the precast plastic part. These chisels hold the deflected or spread projections in position while the material for the second plastic part is cast therearound.

Other objects and advantages will appear as the specification continues. The invention consists of the steps of the method, as hereinafter described and claimed.

DRAWINGS

For a better understanding of our invention, reference should be had to the accompanying drawings, forming part of this application, in which:

Figure 1 is a rear plan view of a precast plastic part for an article, this part having projections extending from a surface thereof against which a second plastic part is to be cast;

Figure 2 is a vertical sectional view taken along the plane II—II of Figure 1, portions being shown in elevation;

Figure 3 discloses this precast part (Figure 1) disposed in a mold die cavity, with a second die inserted into the first die so as to close the cavity, the second die having wedge-shaped chisels splitting the projections and deflecting portions of each projection in opposite directions;

Figure 4 is a view similar to Figure 3, after the injection of the plastic material for the second part of the article has been completed;

Figure 5 is an elevational view, partly in section, of this first specie of our multi-part article;

Figure 6 is a vertical sectional view taken through closed dies of a slightly modified mold, and illustrating the same precast plastic part (Figure 1) confined in the die cavity, the projections on the precast plastic part being spread at their tops by conical-shaped chisels of the upper or second die;

Figure 7 is a view similar to Figure 6, after the injection of the material for the second plastic part has been accomplished;

Figure 8 is an elevational view, partly in section, of this second specie of our multi-part article;

Figure 9 is a rear plan view of a modified form of precast first part, in which projections are provided along a flange of this part, which are adapted to be cut and deflected to provide mechanical interlocks in the final article;

Figure 10 is a sectional view partly in elevation, taken along the line X—X of Figure 9;

Figure 11 illustrates this modified precast part as being disposed in the cavity of a closed mold, the upper die of which is provided with chisels for cutting and deflecting the projections mentioned in connection with Figure 9;

Figure 12 is a view corresponding with Figure 11, but showing the injection of the plastic material for the second part injected into the closed mold;

Figure 13 is an elevational view, partly in section, of the third specie of our multi-part article;

Figure 14 is a rear plan view of a further specie of our precast first part, in which diagonal fillets are provided at the corners of a marginal flange of this part;

Figure 15 is a vertical sectional view taken along the inclined line XV—XV of Figure 14;

Figure 16 illustrates this precast part (Figure 14) as being disclosed in the closed dies of a modified mold;

Figure 17 is a sectional view corresponding with Figure 16, but showing the injection of the second plastic material after it has been completed; and Figure 18 is a vertical sectional view taken through the fourth specie of our multi-part plastic article.

While we have shown only the preferred forms of our invention, it should be understood that various changes, or modifications, may be made within the scope of the appended claims without departing from the spirit thereof.

DETAILED DESCRIPTION

First specie

Referring now to Figures 1 to 5, inclusive, we have illustrated therein our method and mold for forming a multi-part plastic article, which is indicated generally at A. It includes a precast first part B and a subsequently-cast second part C that are mechanically interlocked by projections 10.

As illustrated in Figures 1 and 2, the precast part B includes a base 11 having an upstanding marginal flange or rim 12 extending around the perimeter thereof. This base is fashioned with a slot 14 through which material of the part C extends in the final article to produce a desired character. As shown herein, this character consists of the letter "O." The projections 10 are formed integral with and rise from the base.

For the purpose of completing the multi-part article A after the precast part B has been made, we provide a mold that includes lower and upper dies D and E, respectively. The lower die has a cavity 15 therein, which is designed to receive and support the precast first part B (see Figure 3), with the base 11 resting on the bottom 16 of the die cavity and the projections 10 extending upwardly.

Now the upper mold E is brought into position to close the open end of the die cavity 15. Core-like chisels 17 extend downwardly from this die and have wedge-shaped lower ends 18. These chisels are axially aligned with the projections. As the mold is closed, the chisels cut into the projections 10, deflecting portions 10a of each projection in opposite directions.

It is quite apparent from Figure 3 that the deflected portions 10a of the projections extend in angular relation with and overhang the base 11 of the precast first part B. In other words, undercuts are provided underneath the outwardly-directed top portions of the projections.

At this time, plastic material for the second part C of the final article A is injected through an orifice 19 leading to the unoccupied space 15a of the die cavity. While the portions 10a of the projections are held in oppositely-deflected positions by the lower ends of the chisels, the incoming plastic flows over the upper surface 20 of the base 11 and embeds the projections 10 therein.

Upon opening the mold, the completed article may be withdrawn, and the undesired sprue 21 removed. The parts B and C may be made of any desired contrasting colors. The split and deflected upper ends of the projections provide mechanical interlocks between the two plastic parts. A central core 22 is carried by the upper die E to leave a recess 23 in the final article.

Second specie

Our multi-part plastic article A2, and the modified lower and upper dies D2 and E2, respectively, are shown in Figures 6 to 8, inclusive. When made initially, the precast first part B2, as used in Figures 6–8, is identical with that shown in Figures 1 and 2. Accordingly, like reference numerals have been applied to corresponding parts.

Moreover, the lower die D2 in Figures 6 and 7 is identical with the lower die D previously described. Also, the upper die E2 is very similar to the upper die E, excepting for the fact that it has conical-shaped lower ends 24 on its chisels 17b. Again, we have used the same reference numerals to designate corresponding parts of the molds in Figures 6–7 and 1–5.

As clearly shown in Figure 6, the core-like chisels 17b are axially aligned with the projections 10 of the precast part B2. Accordingly, when the dies D2 and E2 are closed, the conical-shaped lower ends 24 will penetrate into these projections, causing the upper portions 10b of the latter to expand outwardly. Upon injecting the plastic material for the second part C2, as in Figure 7, this incoming material will flow over the upper surface 20 of the base 11, embedding the projections therein and producing mechanical interlocks between the parts B2—C2.

Third specie

Turning to the form of our invention, as disclosed in Figures 9 to 13, inclusive, the third modified article A3 consists of a precast first plastic part B3 and a subsequently-cast second part C3.

In its structural features, the part B3 is fashioned with a base 25 having a marginal flange 26 rising therefrom. This base is formed with a slot 27 extending therethrough to receive material when the second part C3 is cast against the first. This will produce a character, which has been illustrated as providing the letter "O". Projections 28 are formed at intervals along the interior surface of the flange 26. As shown in Figure 9, one of these projections is disposed at the mid-point of each end and side section 26a and 26b, respectively, of this marginal flange. Moreover, the projections extend downwardly and are formed integral with the base 25.

The precast part B3 is placed in a cavity 29 provided in a lower die D3, with its marginal flange 26 facing upwardly. Thereafter, an upper die E3 is brought into the position shown in Figure 11 so as to form a closure over this cavity.

It will be noted that chisels 17c project downwardly from the upper die E3, and are provided with wedge-shaped lower ends 30. The latter are positioned to penetrate initially into the projections 28 along the dot-dash lines 31 (see Figure 9). As these chisels move downwardly, portions 28a of the projections 28 are deflected toward the center of the precast part B3.

Now the plastic material for the part C3 is injected through an orifice 32 so as to fill the remainder of the cavity 29, as shown in Figure 12. This incoming material flows over the upper surface 25a of the base 25, and embeds the deflected portions 28a therein. A central core 34 may be provided on the die D3 for the purpose of leaving a recess 35 in the completed article A3 (see Figure 13). After this article is withdrawn from the mold, the undesired sprue 36 is removed. The deflected portions 28a mechanically interlock the two parts B3 and C3.

*Fourth specie*

Reference is made to Figures 14 to 18, inclusive. The precast part B4 is quite similar to the part B3 just described. Like reference numerals have been used to designate corresponding parts. However, diagonal fillets 37 are formed at the junctions of the end and side sections 26a and 26b, respectively, of the marginal flange 26 of this precast part (see Figure 14).

The lower die D4 is identical with the die D3, and has its cavity 29 arranged to receive the precast part B4. Chisels 17d project downwardly from the upper die E4, and are fashioned with wedge-shaped lower ends 38. The latter cut into the fillets 37 along the dot-dash lines 39 (see Figure 14) as the chisels 17d move downwardly, deflecting portions 37a of the fillets 37 toward the center of the precast part (see Figure 16).

With the precast part B4 and the mold dies D4 and E4 arranged in the manner illustrated in Figure 16, plastic material for the subsequently-cast part C4 is injected through the orifice 32 to fill the unoccupied space of the die cavity 29 (see Figure 17), producing the final article A4. The incoming plastic material for the second part C4 flows over the upper surface 25a of the base 25 and embeds the deflected portions 37a, producing mechanical interlocks between the two parts in the completed article A4.

We claim:

1. In the herein described method of forming a multi-part plastic article, which includes the steps of: precasting a plastic first part of the article with a surface against which a second part is to be cast; cutting into this precast part and bodily deflecting a portion thereof from a normal into an offset position overhanging said surface, with the deflected portion and said surface defining an undercut; and thereafter injecting plastic material for a second part of the article against said surface for flowing into the undercut and embedding the deflected portion, while still maintaining said portion in its deflected position until the second part solidifies, whereby said portion will be precluded from returning to its original position and will mechanically interlock the two parts.

2. The combination of steps as set forth in claim 1, in which the deflecting of a portion of the first part into offset position is accomplished simultaneously with the cutting into the precast part.

3. In the herein method of forming a multi-part plastic article, which includes the steps of: precasting a plastic first part of the article with at least one projection extending from a surface against which a second part is to be cast; cutting into this projection and bodily deflecting a portion thereof from a normal into an offset position overhanging said surface, with the deflected portion and said surface defining an undercut; and thereafter injecting plastic material for a second part of the article against said surface for flowing into the undercut and embedding the deflected portion, while still maintaining said portion in its deflected position until the second part solidifies, whereby said portion will be precluded from returning to its original position and will mechanically interlock the two parts.

4. In the herein described method of forming a multi-part plastic article, which includes the steps of: precasting a plastic first part of the article with a surface against which a second part is to be cast; cutting into spaced-apart sections of this precast part and bodily deflecting portions of these sections toward each other; these portions being deflected from normal into offset positions overhanging said surface and defining undercuts; and thereafter injecting plastic material for a second part of the article against said surface for flowing into the undercuts and embedding the deflected portions, while still maintaining said portions in their deflected positions until the second part solidifies, whereby said portions will be precluded from returning to their original positions and will provide spaced-apart mechanical interlocks between the two parts.

5. In the herein method of forming a multi-part plastic article, which includes the steps of: precasting a plastic first part of the article with at least one projection extending from a surface against which a second part is to be cast; cutting axially into this projection, while at the same time bodily spreading portions thereof in opposite directions from normal into offset positions overhanging said surface; these portions and said surface defining undercuts; and thereafter injecting plastic material for a second part of the article against said surface for flowing into the undercuts and embedding the offset portions, while still maintaining said portions in offset positions until the second part solidifies, whereby said portions will be precluded from returning to their normal positions and will mechanically interlock the two parts.

6. In the herein method of forming a multi-part plastic article, which includes the steps of: precasting a plastic first part of the article with at least one projection extending from a surface against which a second part is to be cast; cutting into this projection and bodily deflecting a portion thereof from a normal into an offset position overhanging said surface, with the deflected portion and said surface defining an undercut; and thereafter injecting plastic material for a second part of the article against said surface for flowing into the undercut and embedding the deflected portion, while still maintaining said portion in its deflected position until the second part solidifies, whereby said portion will be precluded from returning to its original position and will mechanically interlock the two parts; the deflecting of a portion of the projection into offset position being accomplished simultaneously with the cutting thereinto.

7. In the herein described method of forming a multi-part plastic article, which includes the steps of: precasting a first part of the article with a surface against which a second part of the article is to be cast; placing this precast part in a cavity of a first die so as to be supported by the wall of the cavity; moving a second die into coacting relation with the first die to close the cavity, while utilizing the second die to cut a portion of the precast part and to simultaneously deflect this portion from a normal into an offset position overhanging said surface; and thereafter injecting plastic material for a second part of the article into the unoccupied space of the dies for flowing under and around the offset portion, while the second die is employed for maintaining said portion in its deflected position until the second part solidifies, whereby said portion will be precluded from returning to its original position and will mechanically interlock the two parts.

ELMER L. DANIELSON.
FLOYD J. DOFSEN.

REFERENCES CITED

The following references are of record in the file of this patent:

UNITED STATES PATENTS

| Number | Name | Date |
|---|---|---|
| 701,492 | Matthes | June 3, 1902 |
| 1,200,992 | Searles | Oct. 10, 1916 |
| 1,284,553 | Apple | Nov. 12, 1918 |
| 1,668,590 | Hilfreich | May 8, 1928 |
| 2,062,880 | Hansen | Dec. 1, 1936 |
| 2,222,755 | Watson | Nov. 26, 1940 |
| 2,483,832 | Kingston | Oct. 4, 1949 |